(12) United States Patent
Ikeda et al.

(10) Patent No.: US 11,189,397 B2
(45) Date of Patent: Nov. 30, 2021

(54) OUTER COVER BODY FOR ELECTRICAL WIRES AND OUTER-COVER-BODY-ATTACHED WIRE HARNESS

(71) Applicants: FURUKAWA ELECTRIC CO., LTD., Tokyo (JP); FURUKAWA AUTOMOTIVE SYSTEMS INC., Shiga (JP)

(72) Inventors: Hideyuki Ikeda, Tokyo (JP); Yoshikazu Kamei, Tokyo (JP); Naoyuki Kojima, Tokyo (JP); Satoshi Takamura, Tokyo (JP); Takashi Oshino, Tokyo (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 0 days.

(21) Appl. No.: 16/483,690

(22) PCT Filed: May 18, 2018

(86) PCT No.: PCT/JP2018/019250
§ 371 (c)(1),
(2) Date: Aug. 5, 2019

(87) PCT Pub. No.: WO2019/003704
PCT Pub. Date: Jan. 3, 2019

(65) Prior Publication Data
US 2020/0027628 A1 Jan. 23, 2020

(30) Foreign Application Priority Data

Jun. 30, 2017 (JP) .............................. JP2017-129293
Nov. 17, 2017 (JP) .............................. JP2017-222096

(51) Int. Cl.
*H01B 7/24* (2006.01)
*H02G 3/04* (2006.01)

(52) U.S. Cl.
CPC .............. *H01B 7/24* (2013.01); *H02G 3/0462* (2013.01)

(58) Field of Classification Search
CPC ............ B29C 44/0415; B29C 44/5654; B60R 16/0215; B60R 16/0239; B16R 16/02; H01B 7/24; H02G 3/04; H02G 3/0462
(Continued)

(56) References Cited

U.S. PATENT DOCUMENTS 5,779,952 A * 7/1998 Matsumoto ......... B29C 44/0415
264/328.12
2001/0036522 A1 11/2001 Hanada et al.
(Continued)

FOREIGN PATENT DOCUMENTS

CN 1204387 A 1/1999
CN 2367880 Y 3/2000
(Continued)

OTHER PUBLICATIONS

Polyolefins_pp. 1-3_Aug. 2016.*
(Continued)

*Primary Examiner* — Timothy J Thompson
*Assistant Examiner* — Guillermo J Egoavil
(74) *Attorney, Agent, or Firm* — Birch, Stewart, Kolasch & Birch, LLP.

(57) ABSTRACT

Providing an outer cover body for electrical wires that can improve the degree of freedom of design while preventing anisotropy in mechanical properties and also make it possible to form even a compact outer cover body for electrical wires. An outer cover body for electrical wires that is to be attached to the outer periphery of an electrical wire, the outer
(Continued)

cover body for electrical wires being formed of a bent thermoplastic resin foam sheet having a density of not less than 200 Kg/m³ and not more than 700 Kg/m³.

16 Claims, 4 Drawing Sheets

(58) Field of Classification Search
USPC .............................. 174/72 A; 264/51; 164/51
See application file for complete search history.

(56) References Cited

U.S. PATENT DOCUMENTS

| | | | | |
|---|---|---|---|---|
| 2002/0148546 | A1* | 10/2002 | Tabor | B29C 41/045 152/513 |
| 2002/0163098 | A1 | 11/2002 | Sakamoto et al. | |
| 2003/0158275 | A1 | 8/2003 | McClelland et al. | |
| 2011/0189465 | A1* | 8/2011 | Maurer | B29C 51/16 428/304.4 |
| 2011/0200813 | A1* | 8/2011 | Okura | C08J 9/36 428/220 |
| 2012/0115968 | A1* | 5/2012 | Shima | C08J 9/0061 521/59 |
| 2012/0220179 | A1* | 8/2012 | Nakase | D02G 3/04 442/181 |
| 2014/0322505 | A1* | 10/2014 | Ikeda | B32B 5/18 428/215 |
| 2015/0038606 | A1* | 2/2015 | Baghdadi | B29C 44/3446 521/137 |
| 2016/0167098 | A1* | 6/2016 | Weng | B21D 5/08 72/379.2 |
| 2017/0095993 | A1* | 4/2017 | Tomomatsu | B32B 7/02 |
| 2018/0044497 | A1* | 2/2018 | Kondo | C08J 9/122 |
| 2018/0170287 | A1 | 6/2018 | Mizuno et al. | |
| 2019/0375347 | A1* | 12/2019 | Kotani | H02G 3/0437 |

FOREIGN PATENT DOCUMENTS

| | | | | |
|---|---|---|---|---|
| CN | 1316324 | A | | 10/2001 |
| CN | 1373034 | A | | 10/2002 |
| CN | 2766431 | Y | | 3/2006 |
| CN | 2781614 | Y | * | 5/2006 ............ H02G 3/04 |
| CN | 103244753 | A | | 8/2013 |
| CN | 103797386 | A | | 5/2014 |
| CN | 104114365 | A | | 10/2014 |
| CN | 106393908 | A | * | 2/2017 ........... B32B 17/067 |
| CN | 106427163 | A | | 2/2017 |
| EP | 1 174 458 | A1 | | 1/2002 |
| EP | 2 518 735 | A1 | | 10/2012 |
| JP | 08238704 | A | * | 9/1996 ............ B32B 25/08 |
| JP | 2001-261874 | A | | 9/2001 |
| JP | 2001261874 | A | * | 9/2001 ............ B24B 37/20 |
| JP | 2004-504463 | A | | 2/2004 |
| JP | 2008031236 | A | * | 2/2008 ............ B32B 27/30 |
| JP | 4842580 | B2 | * | 12/2011 ............ B29C 49/04 |
| JP | 2013-127866 | A | | 6/2013 |
| JP | 2014005452 | A | * | 1/2014 ............ C08J 9/0061 |
| JP | 2014062245 | A | * | 4/2014 ............... C08J 9/12 |
| JP | 2014-141548 | A | | 8/2014 |
| JP | 2016-99454 | A | | 5/2016 |
| JP | 2016-201240 | A | | 12/2016 |
| JP | 2017-22803 | A | | 1/2017 |
| TW | 201102258 | A | * | 1/2011 ............ B29C 51/26 |
| WO | WO 2015/016056 | A1 | | 2/2015 |
| WO | WO 2016/044826 | A1 | | 3/2016 |
| WO | WO 2016/203969 | A | | 12/2016 |
| WO | WO-2017110470 | A1 | * | 6/2017 ............... H02G 3/04 |

OTHER PUBLICATIONS

Hardness Conversion Chart_pp. 1-3_Jan. 2016.*
Hardness-Conversion-Table_pp. 1-2_Aug. 2015.*
English translation of International Preliminary Report on Patentability and English translation of the Written Opinion of the International Searching Authority (forms PCT/IB/373 and PCT/ISA/237), dated Dec. 31, 2019, for corresponding International Application No. PCT/JP2018/019250.
International Search Report for PCT/JP2018/019250 (PCT/ISA/210) dated Jun. 12, 2018.
Written Opinion of the International Searching Authority for PCT/JP2018/019250 (PCT/ISA/237) dated Jun. 12, 2018.
Chinese Office Action and Search Report, dated Mar. 2, 2020, for corresponding Chinese Application No. 201880005508.7, with an English translation.
Chinese Office Action and Search Report, dated Oct. 12, 2020, for Chinese Appliation No. 201880005508.7, with an English translation.
Chinese Office Action for corresponding Chinese Application No. 201880005508.7 dated Feb. 10, 2021, with English translation.
Extended European Search Report for corresponding European Application No. 18823633.5, dated Mar. 1, 2021.
Chinese Office Action, dated Jun. 30, 2021, for corresponding Chinese Application No. 201880005508.7, with an English translation.
Japanese Office Action for corresponding Japanese Application No. 2018-043743, dated Sep. 14, 2021, with English translation.

* cited by examiner

OUTER COVER BODY FOR ELECTRICAL WIRES AND OUTER-COVER-BODY-ATTACHED WIRE HARNESS

TECHNICAL FIELD

The present invention relates to an outer cover body for electrical wires that is to be attached to the outer periphery of an electrical wire, and an outer-cover-body-attached wire harness.

BACKGROUND ART

Conventionally, an outer cover body for electrical wires, which has a shape along a wiring path of a desired electrical wire, is manufactured by injection molding. However, since the outer cover body for electrical wires manufactured by injection molding is made of a solid resin, there is a problem of difficulty in reducing weight. Moreover, since a mold for injection molding is required, there is a problem that prevents a reduction of costs and makes it difficult to cope with small lot production of outer cover body for electrical wires of various types. Furthermore, since an outer cover body for electrical wires manufactured by an injection molding mold apparatus has a three-dimensional shape, there is a problem of poor transportation efficiency and storage characteristics.

In addition, as an outer cover body for electrical wires that is to be attached to the outer periphery of an electrical wire routed in a vehicle or the like, there is a known protector that is a hollow plate material having a hollow structure formed between a plurality of plate members, and covers the outer periphery of a wire harness to protect the wire harness from external forces (Patent Literature 1). In Patent Literature 1, as the hollow structure of the hollow plate material, an intervening member is used, the intervening member being a plate member having a shape in which uneven portions constituted by ridge portions and valley portions continue in a wave form.

However, in the hollow plate material having the hollow structure of the intervening member, since the mechanical properties are anisotropic, cutting is restricted in the directional aspect when cutting out the hollow plate material in a shape corresponding to the outer cover body for electrical wires, and therefore a sufficient degree of freedom of design cannot be obtained. Hence, the cutting shape for the outer cover body for electrical wires cannot be arranged at the highest density in the plane of the hollow plate material, and there is a problem that prevents a reduction of costs. Further, in the hollow plate material, since the dimension of the uneven portions of the hollow structure is large, it is difficult to cut out the hollow plate material into a small shape while equalizing the mechanical properties, and thus this material has a problem of not being suitable for the formation of a compact outer cover body for electrical wires.

DOCUMENT LIST

Patent Literature

Patent Literature 1: International Publication No. WO2015-016056

SUMMARY OF INVENTION

Technical Problems

In consideration of the above-described circumstances, it is an object of the present invention to provide an outer cover body for electrical wires that can improve the degree of freedom of design while preventing anisotropy in mechanical properties and can also make it possible to form a compact outer cover body for electrical wires.

Solution to Problems

A mode of the present invention is an outer cover body for electrical wires that is to be attached to an outer periphery of an electrical wire, the outer cover body for electrical wires being formed of a bent thermoplastic resin foam sheet having a density of not less than 200 $Kg/m^3$ and not more than 700 $Kg/m^3$.

A mode of the present invention is the outer cover body for electrical wires, wherein a thickness of the thermoplastic resin foam sheet is not less than 0.50 mm and not more than 4.0 mm.

A mode of the present invention is the outer cover body for electrical wires, wherein a density of the thermoplastic resin foam sheet at a bending portion is higher than a density of the thermoplastic resin foam sheet at a portion excluding the bending portion, and is not less than 400 $Kg/m^3$ and not more than 1200 $Kg/m^3$.

A mode of the present invention is the outer cover body for electrical wires, wherein the thermoplastic resin foam sheet has a curved portion with R of not less than 0.05 mm and not more than 1.0 mm on a cut cross section.

A mode of the present invention is the outer cover body for electrical wires, including a non-foam layer on each of both surfaces of the thermoplastic resin foam sheet.

A mode of the present invention is the outer cover body for electrical wires, wherein a thickness of the non-foam layer is not less than 10 μm and not more than 100 μm.

A mode of the present invention is the outer cover body for electrical wires, wherein the thermoplastic resin foam sheet has an absorbance of not less than 0.005 in a spectral region of not less than 15000 nm and not more than 25000 nm. The absorbance is preferably not less than 0.01, and more preferably not less than 0.02.

A mode of the present invention is the outer cover body for electrical wires, wherein a Shore hardness (HSC) of the thermoplastic resin foam sheet is not less than 60 and not more than 100.

A mode of the present invention is the outer cover body for electrical wires, wherein a bubble number density in a foam layer of the thermoplastic resin foam sheet is not less than 800 bubbles/$mm^3$.

A mode of the present invention is the outer cover body for electrical wires, wherein the thermoplastic resin foam sheet has a tensile strength of not less than 3 MPa and not more than 10 MPa, and more preferably not less than 4 MPa and not more than 10 MPa, and a ratio of a tensile strength in a second reference linear direction to a tensile strength in a first reference linear direction on a plane of the thermoplastic resin foam sheet is not less than 50% and not more than 200%, more preferably not less than 60% and not more than 180%, and further more preferably not less than 80% and not more than 120%, the second reference linear direction being orthogonal to the first reference linear direction.

The outer cover body for electrical wires, wherein the thermoplastic resin foam sheet has a tear strength of not less than 150 N/cm, which is measured in conformity with JIS K 6767: 1999.

A mode of the present invention is an outer-cover-body-attached wire harness, including: a wire harness; and the outer cover body for electrical wires, wherein the outer cover body for electrical wires is attached to an outer periphery of the wire harness.

Effects of Invention

According to a mode of the outer cover body for electrical wires of the present invention, since the outer cover body is formed by bending the thermoplastic resin foam sheet having a density of not less than 200 Kg/m³ and not more than 700 Kg/m³, anisotropy in mechanical properties is prevented and the degree of freedom of design of the outer cover body for electrical wires is improved, and it is possible to form even a compact outer cover body for electrical wires.

Moreover, according to a mode of the outer cover body for electrical wires of the present invention, since the outer cover body for electrical wires is a bent form of the thermoplastic resin foam sheet, it is possible to reduce weight and cope with small lot production of outer cover body for electrical wires of various types. Further, according to a mode of the outer cover body for electrical wires of the present invention, since the outer cover body for electrical wires is a bent form of the thermoplastic resin foam sheet, the outer cover body for electrical wires can be transported and stored in the form of sheet, and therefore excels in the transportation efficiency and storage characteristics.

According to a mode of the outer cover body for electrical wires of the present invention, a density of the thermoplastic resin foam sheet at the bending portion is higher than a density of the thermoplastic resin foam sheet at the portion excluding the bending portion and is not less than 400 Kg/m³ and not more than 1200 Kg/m³, and therefore it is possible to stably set and keep the shape of the outer cover body for electrical wires.

According to a mode of the outer cover body for electrical wires of the present invention, since the non-foam layer is provided on each of both surfaces of the thermoplastic resin foam sheet, it is possible to prevent a decrease in mechanical strength at the bending portion on an inner surface of the outer cover body for electrical wires, and it is also possible to improve abrasion resistance on an outer surface of the outer cover body for electrical wires and obtain excellent durability even when the outer cover body for electrical wires is mounted on a vehicle or the like where vibration occurs.

According to a mode of the outer cover body for electrical wires of the present invention, since the thermoplastic resin foam sheet has an absorbance of not less than 0.005 in the spectral region of not less than 15000 nm and not more than 25000 nm, flame spread characteristics can be reduced, and it is possible to suitably use the thermoplastic resin foam sheet, for example, as an outer cover body for a wire harness to be wired in an automobile. The absorbance is preferably not less than 0.01, and more preferably not less than 0.02.

According to a mode of the outer cover body for electrical wires of the present invention, since the bubble number density of the foam layer of the thermoplastic resin foam sheet is not less than 800 bubbles/mm³, anisotropy in mechanical properties is surely prevented, and the degree of freedom of design of the outer cover body for electrical wires is further improved, and it is also possible to more reliably form a compact outer cover body for electrical wires.

According to a mode of the present invention, since the tear strength of the thermoplastic resin foam sheet is not less than 150 N/cm, when mounting the outer-cover-body-attached wire harness on a vehicle or the like through a fixing member, it is possible to improve a connection strength of the outer cover body to the fixing member.

DESCRIPTION OF EMBODIMENTS

Hereinafter, an outer cover body for electrical wires according to an embodiment of the present invention will be described using the drawings.

Figure 1:
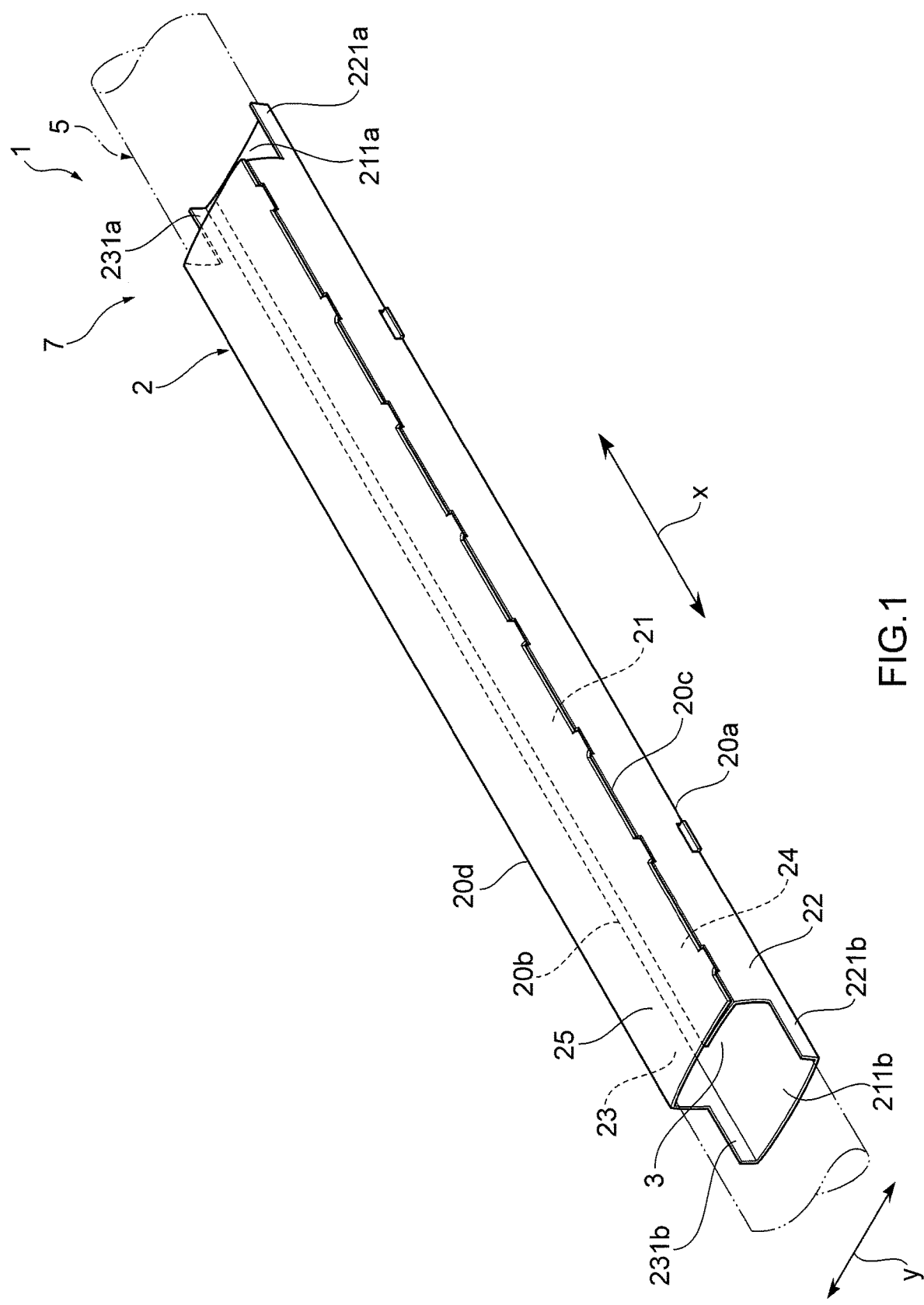
FIG. 1 A perspective view showing an outer cover body, and an outer-cover-body-attached wire harness according to an embodiment of the present invention.

First, with the use of FIGS. 1 and 2, an outer-cover-body-attached wire harness according to an embodiment of the present invention will be described. An outer-cover-body-attached wire harness 1 according to an embodiment of the present invention has a wire harness 5 including a plurality of electrical wires bundled together, and an outer cover body (outer cover body for electrical wires) 7 that is attached to the outer periphery of the wire harness 5. The outer cover body 7 has a plurality of wall sections 2 extending along an extending direction of the wire harness 5 (longitudinal direction x in FIG. 1), and has a housing section 3 that is formed by being surrounded by the plurality of wall sections 2 and houses the wire harness 5. In FIG. 1, although the wire harness 5 is shown as one cylindrical shape, the wire harness 5 is a plurality of electrical wires bundled together.

The plurality of wall sections 2 of the outer cover body 7 are integrally formed by bending one piece of a thermoplastic resin foam sheet. The thermoplastic resin foam sheet is bent at bending portions 20a to 20d, and thereby forming the plurality of wall sections 2. The plurality of wall sections 2 include: a bottom wall section 21; a side wall section 22 continuously formed from an edge of the bottom wall section 21 via the bending portion 20a; a side wall section 23 continuously formed from an edge of the bottom wall section 21 via the bending portion 20b; an upper wall section 24 continuously formed from a front edge of the side wall section 22 via the bending portion 20c; and a lid wall section 25 continuously formed from a front edge of the side wall section 23 via the bending portion 20d.

Figure 2:
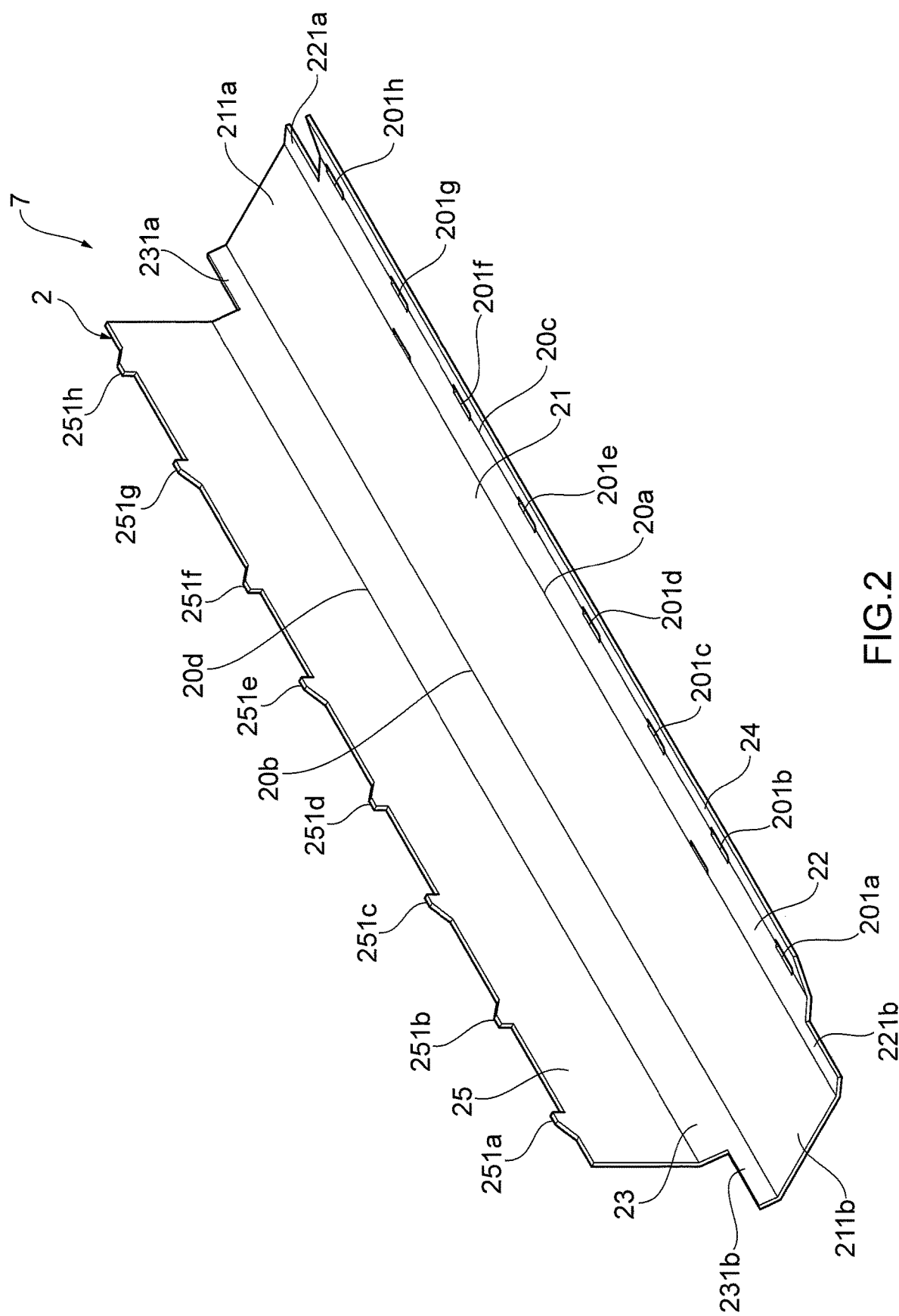
FIG. 2 A perspective view showing a developed state of the outer cover body shown in FIG. 1.

As shown in FIG. 2, in the bending portion 20c among the bending portions 20a to 20d, locking holes 201a to 201h are formed at predetermined intervals along the longitudinal direction x to allow insertion of later-described locking pieces 251a to 251h, respectively.

As shown in FIG. 1, the bottom wall section 21 has, at both ends in the longitudinal direction x, extended portions 211a, 211b extending from the both ends of the upper wall section 24 and the lid wall section 25 in the longitudinal direction x. The side wall section 22 has, at both ends in the longitudinal direction x, standing portions 221a, 221b raised from the extended portions 211a, 211b via the bending portion 20a, and has a partially cutout shape at both ends in the longitudinal direction x. Similarly to the side wall section 22, the side wall section 23 has, at both ends in the longitudinal direction x, standing portions 231a, 231b raised from the extended portions 211a, 211b via the bending portion 20b, and has a partially cutout shape at both ends in the longitudinal direction x.

The upper wall section 24 extends substantially horizontally with respect to the bottom wall section 21, from the front edge of the side wall section 22 to the vicinity of the center in a crosswise direction y that is an orthogonal direction to the longitudinal direction x.

The lid wall section 25 is arranged to overlap the upper wall section 24 from above. As shown in FIG. 2, the lid wall section 25 has, at the front edge, the locking pieces 251a to 251h that can be inserted into the locking holes 201a to 201h. The locking pieces 251a to 251h are provided at predetermined intervals corresponding to the locking holes 201a to 201h. Further, among the locking pieces 251a to 251h, the locking pieces 251a, 251c, 251e, 251g have a substantially rectangular shape which is inclined from the lid wall section 25 toward the front edge to one side (the extended portion 211a side) in the longitudinal direction x, and the locking pieces 251b, 251d, 251f, 251h have a substantially rectangular shape which is inclined from the lid wall section 25 toward the front edge to the other side (the extended portion 211b side) in the longitudinal direction x. The shapes of the locking pieces 251a to 251h are not limited to the above-described forms, and it is possible to adopt various shapes in order to keep the shape of the outer cover body 7.

As shown in FIG. 1, the housing section 3 is a section surrounded by the bottom wall section 21, the side wall sections 22, 23, and the lid wall section 25. The housing section 3 is formed by the bottom wall section 21, the side wall sections 22, 23 and the lid wall section 25 into a cylindrical shape with a through-hole from one side (the extended portion 211a side) to the other side (the extended portion 211b side) in the longitudinal direction x, and can house the wire harness 5.

Next, a thermoplastic resin foam sheet to be used for the outer cover body 7 will be described. The type of resin for the thermoplastic resin foam sheet is not particularly limited as long as the resin is a thermoplastic resin, and examples include polyethylene resin, polypropylene resin, polycarbonate resin, polyethylene terephthalate resin, polybutylene terephthalate resin, polyamide resin, polyphenylene sulfide resin, polystyrene resin, polyvinyl chloride resin, polyvinyl acetate resin, polytetrafluoroethylene resin, and acrylic resin.

The density of the thermoplastic resin foam sheet to be used for the outer cover body 7 is not particularly limited as long as the density is in the range of not less than 200 $Kg/m^3$ and not more than 700 $Kg/m^3$, but, from the viewpoint of improving the balance between lightweight and mechanical strength such as tensile strength, the density is preferably not less than 300 $Kg/m^3$ and not more than 600 $Kg/m^3$, and most preferably not less than 350 $Kg/m^3$ and not more than 550 $Kg/m^3$. The outer cover body 7 is formed by bending the thermoplastic resin foam sheet having the density in the above-mentioned range. The density of the thermoplastic resin foam sheet is measured, based on JIS K 7222.

The thickness of the thermoplastic resin foam sheet is not particularly limited, but, from the viewpoint of further improving the balance between ease of bending and mechanical strength such as tensile strength, the thickness is preferably not less than 0.50 mm and not more than 4.0 mm, and most preferably not less than 0.8 mm and not more than 2.5 mm.

The bending portions 20a to 20d may be formed as press-formed portions by press forming a flat thermoplastic resin foam sheet into a shape that is easy to be formed by bending, if necessary. By forming the bending portions 20a to 20d as the press-formed portions, it is possible to facilitate bending and further improve the precision of the bending positions, that is, the precision of the shape and dimensions of the outer cover body 7.

In the case where the bending portions 20a to 20d are the press-formed portions, the bending portions 20a to 20d are high-density portions in which the density of the thermoplastic resin foam sheet is higher than the density in the plurality of wall sections 2 which are portions other than the bending portions 20a to 20d. The density of the thermoplastic resin foam sheet in the bending portions 20a to 20d is not particularly limited as long as the density has a higher value than that in the plurality of wall sections 2, but, from the viewpoint of obtaining bendability of the bending portions 20a to 20d while stably setting and keeping the shape of the outer cover body 7, the density is preferably not less than 400 $Kg/m^3$ and not more than 1200 $Kg/m^3$, and most preferably not less than 500 $Kg/m^3$ and not more than 1200 $Kg/m^3$. The density of the bending portions of the thermoplastic resin foam sheet is measured, based on JIS K 7222, by bringing the bent sheet back into a flat form and cutting out a width of 1 mm from both sides of the bending portions.

In addition, the thermoplastic resin foam sheet may have a non-foam layer on both or one of surfaces. That is to say, the thermoplastic resin foam sheet may have a structure including a foam layer, and a non-foam layer formed on the front surface of the foam layer. By forming the non-foam layer on the front surface of the thermoplastic resin foam sheet, the bending elasticity of the outer cover body 7 is improved, and the protection performance for the wire harness 5 to be housed therein is further improved. It should be noted that, from the viewpoint of further improving the bending elasticity of the outer cover body 7, a three-layer structure including a non-foam layer on each of both surfaces of the thermoplastic resin foam sheet is preferable. Furthermore, by having the non-foam layer on each of both surfaces of the thermoplastic resin foam sheet, it is possible to prevent a decrease in the mechanical strength of the bending portions 20a to 20d on the inner surface of the outer cover body 7 and reduce breakage or the like, and it is also possible to improve the abrasion resistance on the outer surface of the outer cover body 7 and obtain excellent durability even when the outer cover body 7 is mounted, for example, on a vehicle or the like where vibration occurs.

The thickness of the non-foam layer is not particularly limited, but, may be, for example, not less than 10 μm and not more than 100 μm. The Shore hardness (HSC) of the thermoplastic resin foam sheet having the non-foam layer on each of both surfaces is, for example, not less than 60 and not more than 100.

Further, the thermoplastic resin foam sheet may be configured to have an absorbance of not less than 0.005, preferably not less than 0.01, and more preferably not less than 0.02 in a spectral range from not less than 15000 nm to 25000 nm. By adopting such a configuration, the flame spread characteristics of the thermoplastic resin foam sheet can be reduced, and the thermoplastic resin foam sheet can be suitably used as the outer cover body 7 for the wire harness 5 routed, for example, in an automobile. The absorbance can be obtained by, for example, adding an appropriate amount of a colorant, such as a dye or a coloring pigment, to a thermoplastic resin composition that is a material for the thermoplastic resin foam sheet.

The bubble number density in the foam layer of the thermoplastic resin foam sheet is not particularly limited, but, for example, from the viewpoint of more reliably preventing anisotropy in mechanical properties and further improving the degree of freedom of design, and making it possible to more suitably form a compact outer cover body for electrical wires, the lower limit of the bubble number density is preferably not less than 800 bubbles/mm$^3$, and most preferably not less than 1000 bubbles/mm$^3$. On the other hand, from the viewpoint of obtaining excellent mechanical strength, for example, the upper limit of the bubble number density is not more than $10^{10}$ bubbles/mm$^3$. For the bubble number density in the present invention, an SEM photograph of a longitudinal section of the thermoplastic resin foam sheet was photographed, the number n of bubbles existing in an arbitrary 100×100 μm region in the foam layer was counted on the SEM photograph, and the number of bubbles existing per 1 mm$^2$ was calculated. By raising the obtained number to the power of 3/2 to convert into the number of bubbles per 1 mm$^3$, the bubble number density was obtained.

Even if the bending portions 20*a* to 20*d* are not the press-formed portions, when the thermoplastic resin foam sheet is bent, bubbles in the bending portions 20*a* to 20*d* are crushed, resulting in a higher density than in the wall sections 2. Like the above, the density in the bending portions 20*a* to 20*d* which are not the press-formed portions is preferably not less than 400 Kg/m$^3$ and not more than 1200 Kg/m$^3$, and most preferably not less than 500 Kg/m$^3$ and not more than 1200 Kg/m$^3$.

That is to say, the thermoplastic resin foam sheet to be used for the outer cover body 7 has excellent bendability. This is because, since the thermoplastic resin foam sheet has the above-described density range and preferably the above-described range of the bubble number density in the foam layer, when the thermoplastic resin foam sheet is bent, the bubbles in the bending portions 20*a* to 20*d* are crushed, thereby preventing breakage of the bending portions 20*a* to 20*d* of the thermoplastic resin foam sheet. Hence, the bending portions 20*a* to 20*d* may be made in a form that is easy to be bent and formed into a desired shape by, for example, forming half-cut portions, cut portions in the form of broken lines or the like in the bending portions 20*a* to 20*d*, instead of the press-formed portions.

The ratio of a tensile strength in a second reference linear direction orthogonal to an arbitrary first reference linear direction on the thermoplastic resin foam sheet surface to a tensile strength in the first reference linear direction is not less than 50% and not more than 200%, more preferably not less than 60% and not more than 180%, and most preferably not less than 80% and not more than 120%. By making the thermoplastic resin foam sheet have the above-mentioned range of the tensile strength ratio, it is possible to further improve isotropy in mechanical properties, and therefore the degree of freedom of design is further improved, and even a compact outer cover body for electrical wires can be more suitably formed.

Furthermore, the tensile strength of the thermoplastic resin foam sheet is not particularly limited, but, from the viewpoint of further improving the protection performance for the wire harness 5 to be housed therein, the lower limit of the tensile strength is preferably not less than 3 MPa, more preferably not less than 4 MPa, and most preferably not less than 6 MPa. On the other hand, the upper limit of the tensile strength is preferably not more than 10 MPa from the viewpoint of moldability of the outer cover body 7. The tensile strength in the present invention is measured, based on JIS K 6767: 1999.

Figure 3:
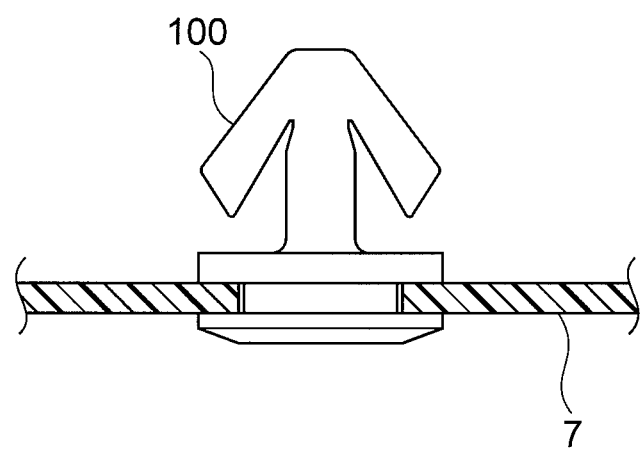
FIG. 3 An explanatory diagram of attaching means for an outer cover body according to an embodiment of the present invention.

The tear strength of the thermoplastic resin foam sheet is not particularly limited, but, from the viewpoint of improving the connection strength of the outer cover body 7 to a fixing member when mounting the outer cover body 7 on a vehicle or the like with the use of the fixing member, such as fitting in a vehicle body (not shown) with a clamp 100 to which the outer cover body 7 is attached as shown in FIG. 3, the lower limit of the tear strength is preferably not less than 150 N/cm, more preferably not less than 200 N/cm, and most preferably not less than 250 N/cm. On the other hand, the upper limit of the tear strength is preferably as high as possible, but, for example, not more than 2000 N/cm. The tear strength in the present invention is measured, based on JIS K 6767: 1999. The method of mounting the outer cover body 7 on a vehicle or the like is not limited to the fitting with the clamp 100, and it is possible to use, for example, adhesion or bonding with an adhesive tape or a bonding agent, or tying with a band, instead of the fitting.

Figure 4:
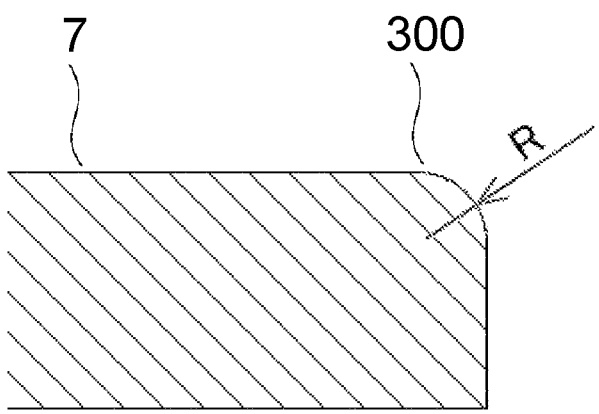
FIG. 4 A view showing a curved portion of the outer cover body.

Next, a method of forming the above-described outer cover body 7 and a method of forming the outer-cover-body-attached wire harness 1 by placing the wire harness 5 in the outer cover body 7 will be described respectively. In the method of forming the outer cover body 7, first, a punching process is performed to punch out a portion corresponding to the outer cover body 7 from a thermoplastic resin foam sheet that is a base material for forming the outer cover body 7. As the punching process, from the viewpoints of low cost and simplicity of processing, examples include punching with a Thomson die cutter. When punching with the Thomson die cutter, by appropriately setting the shape of the blade, it is possible to form a curved portion 300 with R of not less than 0.05 mm and not more than 1.0 mm on the cut cross section of the thermoplastic resin foam sheet (see FIG. 4).

After punching out the portion corresponding to the outer cover body 7, press forming is performed on portions corresponding to the bending portions 20*a* to 20*d* in the punched-out portion corresponding to the outer cover body 7. By performing the press forming, the bending portions 20*a* to 20*d* are formed, and good bendability is imparted to the bending portions 20*a* to 20*d*. Thus, since the bending portions 20*a* to 20*d* are the portions subjected to the press forming, the density of the thermoplastic resin foam sheet is higher in the bending portions 20*a* to 20*d* than in portions other than the bending portions 20*a* to 20*d*.

In the method of attaching the outer cover body 7 formed as described above to the wire harness 5, first, the side wall sections 22, 23 are bent to be substantially perpendicular to the bottom wall section 21 at the bending portions 20*a*, 20*b*. When the side wall sections 22, 23 are bent at the bending portions 20*a*, 20*b*, the space between the side wall sections 22, 23 on the front edge portion side is in the shape open upward, along the longitudinal direction x.

After bending the bending portions 20*a*, 20*b*, the wire harness 5 is placed on the bottom wall section 21, and the upper wall section 24 is bent at the bending portion 20*c* to be substantially parallel to the bottom wall section 21. Next, the lid wall section 25 is bent at the bending portion 20*d* to be substantially parallel to the bottom wall section 21. When the lid wall section 25 is bent at the bending portion 20*d*, the opening between the front edge portions of the side wall sections 22, 23 is closed and the housing section 3 is formed, and the wire harness 5 is housed in the housing section 3 in the state of passing through the housing section 3.

Next, by inserting and fitting the locking pieces 251*a* to 251*h* into the locking holes 201*a* to 201*h*, respectively, the state in which the opening between the front edge portions of the side wall sections 22, 23 is closed is fixed, and the outer cover body 7 is attached to the outer periphery of the wire harness 5.

The outer cover body 7 may be attached to the outer periphery of a fixing tape for fixing a plurality of electrical wires constituting the wire harness 5 so that the electrical wires are not scattered, or may be attached to the outer periphery of a plurality of electrical wires for which a fixing tape is not used. Alternatively, the outer cover body 7 may be attached to the outer periphery of one electrical wire.

In a conventional outer cover body for electrical wires, since the mechanical properties of a hollow plate material, which is the base material, have anisotropy, cutting is restricted in the directional aspect when cutting out the hollow plate material into a shape corresponding to the outer cover body for electrical wires, and a sufficient degree of freedom of design cannot obtained, and also this material is not suitable for forming the outer cover body 7 of compact size, whereas the outer cover body 7 according to the above-described embodiment of the present invention is formed by bending a thermoplastic resin foam sheet having a density of not less than 200 Kg/m$^3$ and not more than 700 Kg/m$^3$ and excellent isotropic mechanical properties, and therefore the degree of freedom of design of the outer cover body 7 is improved and downsizing is also easy.

Moreover, since the outer cover body 7 according to the above-described embodiment of the present invention is a bent form of the thermoplastic resin foam sheet, it is possible to reduce weight compared to an outer cover body for electrical wires manufactured by an injection molding mold apparatus, and it is also possible to cope with small lot production of outer cover body 7 of various types. Further, since the outer cover body 7 according to the above-described embodiment of the present invention can be transported and stored in the form of sheet, the transportation efficiency and storage characteristics are excellent.

Next, another embodiment of the present invention will be described. In the outer cover body 7 according to the above-described embodiment, the plurality of wall sections 2 are formed linearly along the extending direction of the wire harness 5 (the longitudinal direction x in FIG. 1) in conformity with the wire harness 5 that extends substantially linearly, but, instead of this, the plurality of wall sections 2 may be branched to conform to the shape of the wire harness 5, or bent to conform to the shape of the wire harness 5, in the middle of the extending direction. Alternatively, the diameter of the housing section 3 may be enlarged or reduced to conform to the shape of the wire harness 5.

Moreover, in the outer cover body 7 according to the above-described embodiment, all the bending portions 20a to 20d between the plurality of wall sections 2 have a higher density than the density in the plurality of wall sections 2, but, instead of this, a part of the bending portions 20a to 20d may have a higher density than the density in the plurality of wall sections 2.

Further, in the outer cover body 7 according to the above-described embodiment, the cross-sectional shape of the outer cover body 7 in the crosswise direction y is a substantially quadrangle, but, the cross-sectional shape is not particularly limited, and may be, for example, a polygon such as a triangle or a pentagon. Furthermore, in the outer cover body 7 according to the above-described embodiment, the closed state of the opening between the front edge portions of the side wall sections 22, 23 is fixed by fitting the locking pieces 251a to 251h into the locking holes 201a to 201h, but, the fixing means is not particularly limited, and the closed state may be fixed by bonding the lid wall section 25 to the upper wall section 24, or the closed state may be fixed by another part that connects the lid wall section 25 and the upper wall section 24 together.

EXAMPLE

The absorbance of the outer cover body was measured using an ATR (attenuated total reflection) technique with Fourier-transform infrared spectroscopy (FTIR). For the measurement, the ALPHA from Bruker Corporation, Germany, was used. The thermoplastic resin foam sheet constituting the outer cover body was measured by the FTIR, and the average value of absorbance from 15000 nm to 25000 nm was used.

Measurement of flammability was carried out with samples obtained by cutting the sheet material into dimensions of 12.5 mm in width and 125 mm in length. Town gas was used, the flame height of a Bunsen burner was adjusted to 25 mm, and the burner was inclined 45 degrees to a horizontally fixed sample and ignited the sample to find the burning speed. The burning speed was found by measuring the burning time between the front lines at the positions of 25 mm from both ends of the sample. The burning speed was evaluated to be good if the burning speed was not more than 75.0 mm/min.

The measurement results of absorbance are shown below. 1.5 mm-thick samples of foam with an expansion of two times in natural color, blue color, and black color were prepared and measured by the FTIR. For the natural color, the absorbance was 0.000, and the burning speed was 75.9 mm/min. For the blue color, the absorbance was 0.002, and the burning speed was 75.7 mm/min. On the other hand, for the black color sample, the absorbance was 0.01, and the burning speed was 65.0 mm/min.

INDUSTRIAL APPLICABILITY

In the present invention, since it is possible to prevent anisotropy in mechanical properties, the degree of freedom of design is improved, and since it is also possible to form a compact outer cover body for electrical wires, the present invention has high utility value, for example, in the field of outer cover body for wire harnesses routed in automobiles, which are required in various shapes.

LIST OF REFERENCE SIGNS 1 outer-cover-body-attached wire harness
2 wall section
3 housing section
5 wire harness
7 outer cover body (outer cover body for electrical wires)
20a bending portion
20b bending portion
20c bending portion
20d bending portion
21 bottom wall section
22, 23 side wall sections
24 upper wall section
25 lid wall section

The invention claimed is:
1. An outer cover body for electrical wires that is to be attached to an outer periphery of an electrical wire, the outer cover body for electrical wires being formed of a bent thermoplastic resin foam sheet having a density of not less than 200 Kg/m$^3$ and not more than 700 Kg/m$^3$, wherein the thermoplastic resin foam sheet has an absorbance of not less than 0.005 in a spectral region of not less than 15000 nm and not more than 25000 nm.

2. The outer cover body for electrical wires according to claim 1, wherein a thickness of the thermoplastic resin foam sheet is not less than 0.50 mm and not more than 4.0 mm.

3. The outer cover body for electrical wires according to claim 1, wherein a density of the thermoplastic resin foam sheet at a bending portion is higher than a density of the thermoplastic resin foam sheet at a portion excluding the bending portion, and is not less than 400 Kg/m$^3$ and not more than 1200 Kg/m$^3$.

4. The outer cover body for electrical wires according to claim 1, wherein the thermoplastic resin foam sheet has a curved portion with R of not less than 0.05 mm and not more than 1.0 mm on a cut cross section.

5. The outer cover body for electrical wires according to claim 1, wherein the outer cover body comprises a non-foam layer on each of both surfaces of the thermoplastic resin foam sheet.

6. The outer cover body for electrical wires according to claim 5, wherein a Shore hardness (HSC) of the thermoplastic resin foam sheet is not less than 60 and not more than 100.

7. The outer cover body for electrical wires according to claim 1, wherein a bubble number density in a foam layer of the thermoplastic resin foam sheet is not less than 800 bubbles/mm$^3$.

8. The outer cover body for electrical wires according to claim 5, wherein the thermoplastic resin foam sheet has a tensile strength of not less than 3 MPa and not more than 10 MPa, and a ratio of a tensile strength in a second reference linear direction to a tensile strength in a first reference linear direction on a plane of the thermoplastic resin foam sheet is not less than 50% and not more than 200%, the second reference linear direction being orthogonal to the first reference linear direction.

9. The outer cover body for electrical wires according to claim 5, wherein the thermoplastic resin foam sheet has a tear strength of not less than 150 N/cm, which is measured in conformity with JIS K 6767: 1999.

10. An outer-cover-body-attached wire harness, comprising:
    a wire harness; and
    an outer cover body for electrical wires according to claim 1, wherein
    the outer cover body for electrical wires is attached to an outer periphery of the wire harness.

11. The outer cover body for electrical wires according to claim 2, wherein a density of the thermoplastic resin foam sheet at a bending portion is higher than a density of the thermoplastic resin foam sheet at a portion excluding the bending portion, and is not less than 400 Kg/m$^3$ and not more than 1200 Kg/m$^3$.

12. The outer cover body for electrical wires according to claim 2, wherein the thermoplastic resin foam sheet has a curved portion with R of not less than 0.05 mm and not more than 1.0 mm on a cut cross section.

13. The outer cover body for electrical wires according to claim 3, wherein the thermoplastic resin foam sheet has a curved portion with R of not less than 0.05 mm and not more than 1.0 mm on a cut cross section.

14. The outer cover body for electrical wires according to claim 3, comprising a non-foam layer on each of both surfaces of the thermoplastic resin foam sheet.

15. The outer cover body for electrical wires according to claim 4, comprising a non-foam layer on each of both surfaces of the thermoplastic resin foam sheet.

16. The outer cover body for electrical wires according to claim 5, wherein a thickness of the non-foam layer is not less than 10 μm and not more than 100 μm.

\* \* \* \* \*